Sept. 21, 1937.  E. J. LYNCH  2,093,614
METHOD OF INSTALLING WINDOWS
Filed Dec. 28, 1936
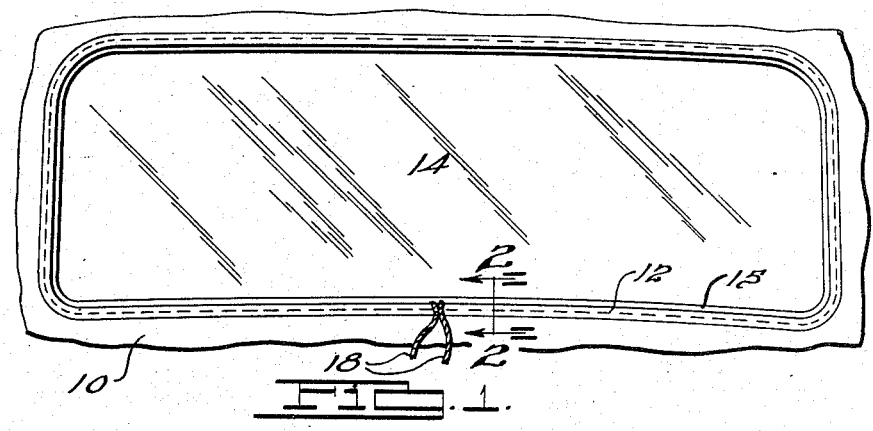
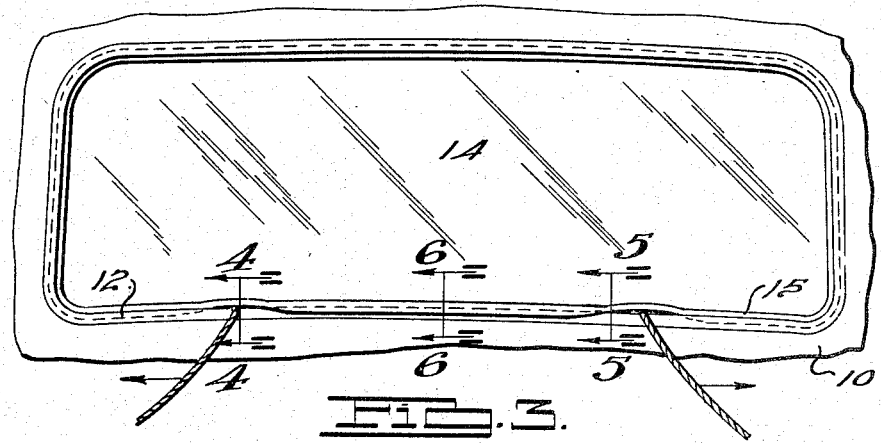
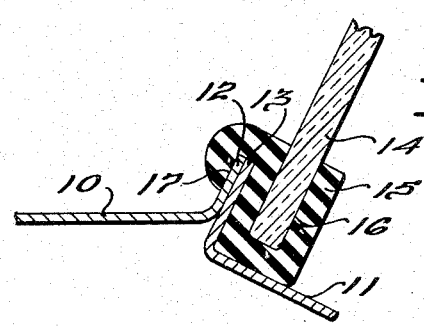
Inventor
Earl J. Lynch.
By Harness, Dickey, Pierce & Hann
Attorneys.

Patented Sept. 21, 1937

2,093,614

UNITED STATES PATENT OFFICE 2,093,614

METHOD OF INSTALLING WINDOWS

Earl J. Lynch, Detroit, Mich., assignor to The Murray Corporation of America, Detroit, Mich., a corporation of Delaware Application December 28, 1936, Serial No. 117,713

2 Claims. (Cl. 296—44)

This invention relates to a novel and improved method of installing windows in position. More particularly it relates to an extremely rapid and simple method of installing permanently mounted windows in a vehicle body.

As is quite conventional in present day vehicle bodies, numerous of the windows thereof, such for example as the windshield, rear quarter windows, and the rear windows, are permanently mounted with respect to the vehicle body and are installed in such a manner that the openings in which said windows are mounted are permanently closed and sealed by the windows mounted therein. In conventional vehicle body construction, the sheet metal panels forming the vehicle body are joined to provide an upstanding flange lying substantially in the plane of the window opening which flange forms one wall of a rabbet against which the pane utilized to close the window opening is mounted. It is quite conventional in constructions of this general character to utilize a sealing strip formed of a resilient material such as molded rubber, which strip extends continuously around the window pane and is provided with a channel adapted to receive and tightly engage the marginal edge of the window pane. The strip is preferably and usually provided with an extending portion which provides a second channel therein presenting in a direction opposite to the first mentioned channel, which second channel is adapted to receive and grip the mating flanges of the sheet metal panels defining the windshield opening. Consequently, it will be seen that the rubber strip serves to maintain the window properly seated in position with respect to the opening in which it is mounted.

It is quite conventional also to form the sealing strip utilized for this purpose from molded rubber and to provide a strip which is continuous or endless in order that the elasticity of the strip as a whole may be utilized in order to effect a tight sealing engagement between the strip and the marginal edge of the window pane. As a result of this construction, the difficulty experienced in the past in installing windows of this general character in position in the vehicle bodies in which they are to be mounted has been eliminated.

It is a primary object of the present invention to provide an extremely simple and expeditious method of installing windows and weather stripping of this general character in position in automotive vehicle bodies.

Many other and further objects, advantages, and features of the present invention will become clearly apparent from the following specification when considered in connection with the accompanying drawing forming a part thereof.

In the drawing:

Figure 1 is an elevational view of a portion of an automotive vehicle body illustrating the improved method of installing a window therein;

Fig. 2 is an enlarged fragmentary sectional view taken substantially on the line 2—2 of Fig. 1 illustrating in detail the manner in which the window and sealing strip are disposed during the initial step of the installation;

Fig. 3 is an elevational view similar to Fig. 1 illustrating in detail the construction and arrangement of the parts during the installation operation;

Fig. 4 is a fragmentary sectional view taken on the line 4—4 of Fig. 3 illustrating in detail an intermediate step in the assembly method;

Fig. 5 is a fragmentary sectional view similar to Fig. 4 taken substantially on the line 5—5 of Fig. 3 and illustrating in detail the sealing strip partially installed in position;

Fig. 6 is an enlarged fragmentary sectional view taken substantially on the line 6—6 of Fig. 3 illustrating the disposition of the sealing strip after the window pane has been completely installed in position.

With more particular reference to the drawing, it will be readily understood that the improved method of the present invention is illustrated as being utilized for the purpose of installing a permanently mounted window pane in position within an opening in a vehicle body construction. It will be readily seen that this specific form of the method of the present invention is merely illustrative of one application in which the improved method will find practical utility. Many other and further modifications of the method falling within the scope of the invention as defined in the subjoined claims will be readily apparent to those skilled in the art.

With more particular reference to the drawing and to the specific embodiment of the invention illustrated therein, it will be seen that the structure shown includes a portion of a vehicle body which, as is conventional, is formed of sheet metal panels. As is conventional in constructions of this general character, the body includes an outer sheet metal panel 10 and an inner panel 11 which panels are spaced from each other in their body portions and are provided in their marginal edges with mating flanges 12 and 13, respectively, which flanges serve to define the marginal edge of a window opening in which a glass pane 14 is adapted to be mounted by the method of the present invention.

As is conventional in constructions of this general character, the inwardly projecting mating flanges extend entirely around the window opening and serve together with the body of the panel 11 to provide a rabbet adapted to receive the marginal edge of the window pane 14 to be mounted in the opening in which a unitary resilient sealing strip 15, formed of rubber or similar suitable material, is molded to provide a cross section substantially of the form shown in Fig. 6 of the drawing. This sealing strip is formed to provide a channel 16 presenting inwardly and adapted to receive the marginal edge of the pane 14 and also includes a channel 17 presenting outwardly in the opposite direction from the channel 16 which latter channel is adapted to receive and tightly engage the mating upstanding flanges 12 and 13. The sealing strip 15 is preferably formed endless and of a length substantially equal to the peripheral dimensions of the window pane 14 with which it is adapted to be associated.

The strip 15 as a whole is of a length such that when it is mounted on the marginal edge of the pane 14 it will be slightly tensioned and due to its inherent resilience, will grip the marginal edge of the pane 14 in sealing engagement with respect thereto. After the sealing strip 15 has been installed on the marginal edge of the pane 14, a length of cord 19 is disposed in the base of the channel 17 and preferably extends completely around the window pane 14 seated in the base of this channel throughout its entire length. This cord has the ends 18 thereof extending from the channel at substantially the same point where these ends will be easily accessible.

When it is desired to install the window, the window is seated in approximate position such as is shown in Fig. 2 and the ends 18 of the cord are passed from the interior of the vehicle through the window opening to the exterior thereof. In general practice, one workman stands interiorly of the vehicle and urges the window pane towards seating position while a workman on the exterior of the vehicle pulls on the ends of the cord 19 which serves to raise up the marginal edge of the strip 15 and dispose the same over the mating flanges 12 and 13. It will be readily appreciated that this operation is substantially progressive and serves to seat the mating flanges 12 and 13 in the base of the channel 17 disposing the parts in substantially the position shown in Fig. 6 of the drawing. It will be seen that after the cord has been completely removed, the flanges 12 and 13 will be seated within the channel 17 entirely around the window thus locking the pane firmly and accurately in position with respect to the opening with which it is associated. It will be readily understood that this operation may be very easily and simply performed and that by practice of the method as herein above described, a substantially tighter seal around the marginal edges of the window may be obtained due to the fact that the sealing strip may be maintained in tensioned condition.

While but one specific embodiment of the improved method of the present invention has been described, many other and further embodiments thereof falling within the scope of the invention as defined in the subjoined claims will be apparent to those skilled in the art.

What is claimed is:

1. The method of installing a window having a double channel sealing strip therearound in a window opening having a flange defining the marginal edge of said opening which comprises inserting a cord in one of the channels of said sealing strip, passing the ends of said cord through said window opening, placing said window in position adjacent said flange and pulling said cord through said window opening to seat said sealing strip around said flange.

2. The method of installing a window pane in a window opening having a flange therearound defining said opening, which comprises installing a sealing strip having oppositely presenting channels on said pane with the marginal edge of said pane seated in one of said channels, inserting a flexible element in the other of said channels, passing the ends of said flexible element through said window opening, positioning said pane adjacent the final position in said window opening and pulling said cord to seat said last mentioned channel in sealing engagement with said flange.

EARL J. LYNCH.